Sept. 17, 1963 R. E. FINCH 3,104,366
REMOTE INDICATOR FOR AIRCRAFT LANDING SYSTEM
Filed Oct. 25, 1961 2 Sheets-Sheet 1

INVENTOR.
ROBERT E. FINCH
BY
ATTORNEY

United States Patent Office 3,104,366
Patented Sept. 17, 1963

3,104,366
REMOTE INDICATOR FOR AIRCRAFT
LANDING SYSTEM
Robert E. Finch, 6308 Orchid Drive, Bethesda, Md.
Filed Oct. 25, 1961, Ser. No. 147,696
5 Claims. (Cl. 340—26)
(Granted under Title 35, U.S. Code (1952), sec. 266)

The invention described herein may be manufactured and used by or for the Government of the United States of America for governmental purposes without the payment of any royalties thereon or therefor.

This invention relates to landing aircraft on decks of airplane carriers and in particular is concerned with visual landing systems of the type utilizing mirrors or Fresnel lens. The invention involves an arrangement of apparatus for indicating at a remote zone whether the mirror or lens components of the landing system, which are located on or in proximity to the ship's deck, are in the required and proper positions in order to provide for the safe landing of aircraft approaching the ship's deck.

One mirror landing system which is currently in use on aircraft carriers is shown in Patent 2,958,847 to D. I. Trufanoff and is made up of equipment including a mirror which is under the control of an operator, located on the deck of a carrier, for adjusting the mirror in accordance with instructions from a party in a remote area of the carrier. The adjustments are made by the operator in order to set the mirror properly for the correct glide angle or angle of approach of an aircraft.

In order to set the mirror for the proper glide path or angle of approach, the type and size of the aircraft and weather conditions are the main factors which are considered by the party in the remote area in his determination of the adjustments required for the proper mirror setting. These required adjustments are made from the prior setting of the mirror, for example, a setting which has been made to position the mirror for the landing of an aircraft which is of a different type or size from that which is approaching for a landing.

This invention is concerned with an arrangement for indicating to the party in the remote area the actual physical adjustments which have been made to the mirror by the operator on the ship's deck in order that the party in the remote zone can check the actual adjustments against those which were required or determined by him to be made. For this purpose, a register is located in the remote zone and as the operator on deck makes actual physical adjustments to the mirror, these adjustments are transmitted to the register through auxiliary equipment and the register will show the adjustments which have actually been made by the operator. Other equipment is manipulable by the party in the remote area to determine the accuracy of the actual adjustments to the mirror.

This invention relates directly to my companion applications Serial No. 809,324, filed April 27, 1959, now Patent No. 3,087,139, for Angle Setting Indicator, and Serial No. 815,235, filed May 22, 1959, now Patent No. 3,050,709, for Remote Control for Angle Setting Indicator.

Figure 1:
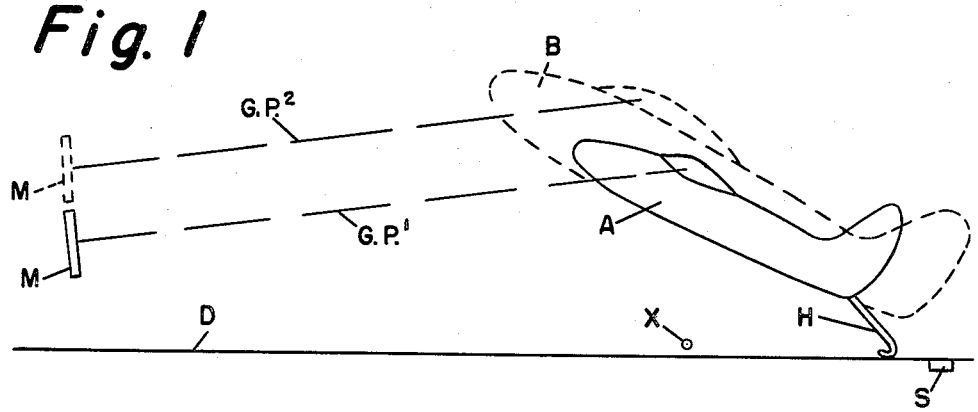
FIG. 1 is a schematic representation showing the mirror of a visual landing system positioned for the proper glide angle for two different types of planes.

In FIG. 1, M indicates the mirror of a visual landing system which in its full line showing is set at the desired angle for a small plane A to land on the ship's deck D along the glide path $GP^1$ which has been predetermined. Assuming the glide path $GP^1$ to be proper, the hook H on the tail of plane A will properly contact the arresting gear at X which is located on the deck and a safe landing will be effected. When a plane B of different size approaches for a landing, the mirror will be set at a different angle as shown by the broken lines in order to provide the glide path $GP^2$ for the proper landing of plane B. The glide paths are lines of vision from the pilot in planes A or B to a light reflected from the light source S suitably located on or adjacent deck D. Assume that the party in the remote area has determined that in order to provide the glide path $GP^2$ for plane B, the mirror would have to be adjusted angularly and also adjusted in height to arrive at the dashed line setting of the mirror or the setting which provides $GP^2$, and also assume the angular adjustment to be 5° and the height adjustment to be 2 feet. The adjusting equipment, under the control of the operator, will inherently effect the angular adjustment of 5° and will also effect a second angular adjustment when the mirror is adjusted in height, thus two angular adjustments are made to the mirror in order to maintain the glide path $GP^2$ parallel to $GP^1$.

It will be understood that the mirror adjusting equipment, as the mirror is raised or lowered, automatically adjusts the angle of the mirror a value in accordance with the height adjustment in order that the glide path will be maintained substantially parallel with that of the original glide path $GP^1$. The present invention is not concerned with the mirror adjusting equpiment but is predicated, in one aspect, on the observation or determination that there is a definite relationship or correlation between the value of the second angular adjustment and the height adjustment. This relationship has been determined empirically and is shown in the following chart:

| Mirror Height Adjustment, Feet | Mirror Angle Adjustment, Minutes |
|---|---|
| 1 | 10 |
| 2 | 20 |
| 3 | 30 |
| 4 | 40 |
| 6 | 60 |
| 8 | 80 |
| 10 | 100 |

In present practice, the height of the mirror adjustment is not made more than ten feet from the deck level but it is believed the relationship of the height adjustment to that of the angle adjustment above ten feet would not be as constant as the relationship for heights up to ten feet and would vary by an increased factor which it has not been necessary to determine, but could be determined if necessary. From the above chart, it will be seen that for each height adjustment of one foot there is a concomitant angular adjustment of approximately ten minutes.

Figure 2:
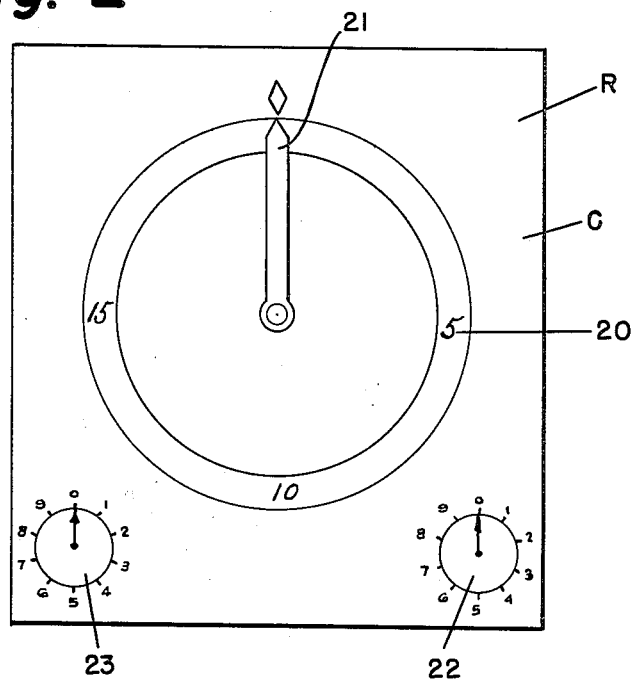
FIG. 2 is a plan view of a register mechanism which is located in the remote area.

In FIG. 2, the register R has a dial 20 which is suitably graduated as shown from zero degrees and an indicator arm 21 which is arranged to be actuated about the dial in a manner to be described in connection with FIG. 3. The dial 20 may be enclosed in a cabinet or housing and have a transparent cover for visually showing the position of the indicator arm 21 relative thereto. Graduated knobs 22 and 23 are provided for manipulation by the party in the remote area for checking the setting of the mirror after the operator has made the angular and height adjustments. The knobs 22 and 23 are shown as graduated respectively in degrees in connection with knob 22 and in feet in connection with knob 23. The knob 23 may be graduated in degrees and calibrated in accordance with the above chart and the graduations for dial 20 and the knobs may be applied to cover C of the register.

Figure 3:
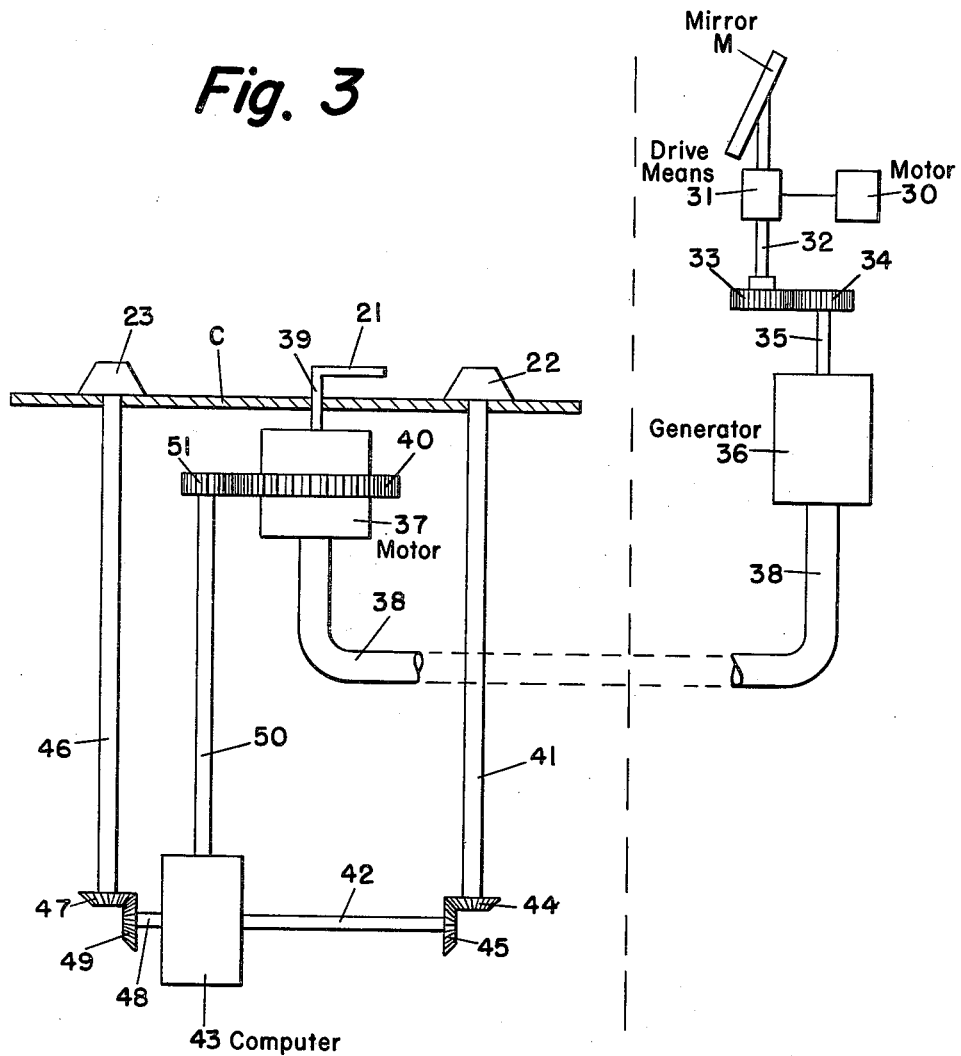
FIG. 3 is generally a diagrammatic showing of the equipment used for indicating the actual mirror adjustments and also the equipment for checking the adjustments.

Referring to FIG. 3, a broken vertical line is used to divide the drawing and to show, generally, at the left of the line, the control equipment and the register which are located in the remote zone, and to the right of the line to show a portion of the register actuating equipment which is located on the ship's landing deck. The adjusting mechanism for the mirror M comprises a motor which is indicated at 30 and is located on the deck for effecting the mirror adjustments through drive means in 31 which turn transmits the mirror movement through connector 32, gears 33—34 and shaft 35 of generator 36. Such adjusting mechanism for the mirror is shown generally at FIG. 4 of the Patent Number 2,784,925 to Goodhart.

As the mirror is adjusted, the generator 36 operates a motor 37, which is located in the remote zone and connected in synchronism with generator 36 through line 38. The shaft 39 of motor 37 is connected to the indicator arm 21 of the registering mechanism of FIG. 2, and as the mirror is adjusted, the indicator arm 21 will be correspondingly moved by the motor shaft 39 and will assume a position relative to a reference point which for example may be assumed to be the "0" reference of the register.

In order to determine the accuracy of the mirror adjustments, a rack, such as a gear annulus 40, is mounted on the motor 37, as shown in FIG. 3, and through manipulation of the graduated knobs 22 and 23 for operating other gearing to be described, the indicator 21 may be returned to the assumed reference "0" on the dial 20.

Knobs 22 and 23 are conveniently disposed exteriorly of the cover C of register R and shaft 41 connects knob 22 with one input shaft 42 of a computer 43 through bevel gears 44—45 while a shaft 46 connects knob 23 with another input shaft 48 of the computer 43 through bevel gears 47—49 and as the knobs 22 and 23 are manipulated, the motor 37 will be physically rotated through the output shaft 50 of the computer and gear 51 in accordance with the values through which the knobs 22 and 23 are moved. No details of the computer construction are considered necessary to be shown but the computer will be designed to provide a means into which can be fed both the angle adjustment, by the knob 22, and the height adjustment, by the knob 23, and the resultant movement transmitted by output shaft 50 to the motor 37.

Operation of the mechanism is as follows, assume that the mirror M in FIG. 1 is set at some initial angle to the ship's deck for landing plane A and that plane B, which is larger than plane A, is approaching for a landing and that an angle adjustment of 5° and also 2 feet in height is required to set the mirror properly for the landing of plane B. The operator then makes his adjustment through mechanism 30 of FIG. 3 and the mirror is set to some position, which may or may not be correct, and the indicator 21 would move from the "0" reference or some other reference point on the dial 20. The party in the remote area would then manipulate the knobs 22 and 23 the required values of 5° and 2 feet or 20 minutes according to the chart and through movement of the motor 37 the indicator 21 would move relative to the reference. If the adjustments actually made to the mirror are correct, the indicator 21 would coincide with "0" or other selected reference point but if it doesn't return to this reference, this fact would then indicate an improper adjustment.

By the above general described operations, it is apparent that after each adjustment is made by the operator on the deck of the carrier, it may be immediately checked by the party in the remote zone and if the mirror adjustment is not properly made it may then be corrected before any subsequent adjustment is made to the mirror.

It will be apparent to those skilled in the art that various changes and modifications may be made to the present disclosure without departing from the spirit of the invention.

I claim:

1. In a system for landing aircraft on the flight deck of a vessel wherein visual means is located on the flight deck and is provided with operator controlled adjusting equipment for moving the visual means through a plurality of angular adjustments for effecting a setting of the visual means, the improvement which comprises a register in a remote zone of the vessel having a reference and a cooperating indicator, a synchronous generator and motor unit, said generator being operative by movement of the visual means, said motor being located in the remote zone and having its shaft connected to the indicator, said synchronous unit being effective to move the indicator from the reference in accordance with angular adjustments of the visual means made by the operator, rotating means for said motor, an integrator having an output shaft operatively connected to said rotating means and a plurality of input shafts, said input shafts being manually operative to rotate the motor through a plurality of values whereby the indicator is moved relative to the reference as a check on the accuracy of the operator adjustments to the visual means.

2. In a system for landing aircraft on the flight deck of a vessel wherein visual means is located on the flight deck and is provided with operator controlled adjusting equipment for moving the visual means through a plurality of angular adjustments for effecting a setting of the visual means, the improvement which comprises a register in a remote zone of the vessel having a reference and a cooperating indicator, a synchronous generator and motor unit, said generator having its shaft connected to the visual means and operable thereby, said motor being located in the remote zone and having its shaft connected to the indicator, said synchronous unit being effective to move the indicator from said reference in accordance with the angular adjustments of the visual means made by the operator, rotating means for said motor, an integrator having an output shaft operatively connected to said rotating means and a plurality of input shafts, said input shafts being manually operative to rotate the motor through a plurality of values whereby the indicator is moved relative to the reference as a check on the accuracy of the operator adjustments to the visual means.

3. In a system for landing aircraft on the flight deck of a vessel wherein visual means is located on the flight deck and is provided with operator controlled adjusting equipment for moving the visual means through a first and a second angular adjustment for effecting a setting of the visual means, the improvement which comprises a register in a remote zone of the vessel having a dial and a cooperating indicator, a synchronous generator and motor unit, said generator being operative by movement of the visual means, said motor being located in the remote zone and having its shaft connected to the indicator, said synchronous unit being effective to rotate the indicator from a reference on the dial in accordance with the first and second angular adjustments of the visual means made by the operator, rotating means for said motor, an integrator having a pair of input shafts and an output shaft, said output shaft being operatively connected to said rotating means, a first manually operable shaft connected to one of the input shafts and a second manually operable shaft connected to the other input shaft, said manually operable shafts being effective to rotate the motor through a first and second value whereby the indicator is moved relative to the reference as a check on the accuracy of the operator adjustments to the visual means.

4. In a system for landing aircraft on the flight deck of a vessel wherein visual means is located on the flight deck and is provided with operator controlled adjusting equipment for moving the visual means through a first and a second angular adjustment for effecting a setting of the visual means, the improvement which comprises a register in a remote zone of the vessel having a dial and a cooperating indicator, a synchronous generator and motor unit, said generator having its shaft connected to the visual means and operable thereby, said motor being located in the remote zone and having its shaft connected to the indicator, said synchronous unit being effective to rotate the indicator from a reference on the dial in accordance with the first and second angular adjustments of the visual means made by the operator, rotating means for said motor, an integrator having a pair of input shafts and an output shaft, said output shaft being operatively connected to said rotating means, a first manually operable shaft connected to one of the input shafts and a second manually operable shaft connected to the other input shaft, said manually operable shafts being effective to rotate the motor through a first and second value whereby the indicator is rotated relative to the reference as a check on the accuracy of the operator adjustments to the visual means.

5. In a system for landing aircraft on the flight deck of a vessel wherein visual means is located on the flight deck and is provided with operator controlled adjusting equipment for moving the visual means through a first and a second angular adjustment for effecting a setting of the visual means, the improvement which comprises a register in a remote zone of the vessel having a circular dial and a cooperating indicator, a synchronous generator and motor unit, said generator having its shaft connected to the visual means and operable thereby, said motor being located in the remote zone and having its shaft connected to the indicator, said synchronous unit being effective to rotate the indicator about the dial from a reference in accordance with the first and second angular adjustments of the visual means made by the operator, a rack carried by said motor, an integrator having a pair of input shafts and an output shaft, said output shaft being geared to said rack for rotating the motor, a first manually operable shaft connected to one of the input shafts and a second manually operable shaft connected to the other input shaft, said manually operable shafts being effective to rotate the motor through a first and second value whereby the indicator is rotated relative to the reference as a check on the accuracy of the operator adjustments to the visual means.

No references cited.